United States Patent
Cheon (10) Patent No.: US 6,347,345 B1
(45) Date of Patent: Feb. 12, 2002

(54) INFORMATION TRANSFER APPARATUS HAVING CONTROL UNIT WITH BTL TRANSCEIVER APPLYING TRANSMISSION ENABLE SIGNAL INPUTTED FROM ETHERNET PROCESSOR MODULE THROUGH BACKPLANE TO CONTROL UNIT

(75) Inventor: Yoon Ho Cheon, Ansan (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/217,929

(22) Filed: Dec. 22, 1998

(30) Foreign Application Priority Data

Dec. 31, 1997 (KR) .............................................. 97-80808

(51) Int. Cl.[7] ............................ G06F 3/00; G06F 13/00; G06F 13/14; G06F 15/173; G06F 1/12
(52) U.S. Cl. ............................ 710/20; 710/15; 710/18; 710/21; 710/33; 710/36; 710/61; 710/62; 709/200; 709/213; 709/224; 709/225; 709/229; 709/232; 709/235; 709/238; 709/248; 709/249; 709/250; 709/400; 712/225; 370/229; 370/230; 370/235; 370/236; 370/254; 370/445; 370/910
(58) Field of Search ................................ 370/229–231, 370/235, 236, 254, 276, 277, 278, 282, 431, 445, 910; 709/200, 213, 220, 223, 224, 225, 229, 232, 235, 238, 248–250, 400; 710/1, 5, 7, 8, 15, 18, 20, 21, 28, 33, 36, 61, 62, 64, 72, 102, 104, 107, 129, 131; 712/225; 713/1

(56) References Cited

U.S. PATENT DOCUMENTS

| | | | | |
|---|---|---|---|---|
| 4,776,041 A | * | 10/1988 | Husbands | 359/120 |
| 5,283,869 A | * | 2/1994 | Adams et al. | |
| 5,428,806 A | * | 6/1995 | Pocrass | 710/104 |
| 5,459,840 A | * | 10/1995 | Isfeld et al. | 710/129 |
| 5,483,640 A | * | 1/1996 | Isfled et al. | 709/213 |
| 5,592,622 A | * | 1/1997 | Isfled et al. | 709/207 |
| 5,648,959 A | * | 7/1997 | Iiyadis et al. | 370/445 |
| 5,726,976 A | * | 3/1998 | Thompson et al. | 370/229 |
| 5,907,544 A | * | 5/1999 | Rypinski | 370/337 |
| 5,907,553 A | * | 5/1999 | Kelly et al. | 370/433 |

(List continued on next page.)

OTHER PUBLICATIONS

ISO/IEC 8802–3, Carrier Sense Multiple Access with Collision Detection (CSMA/CD) Access Method and Physical Layer Specifications, Institute of Electrical & Electronics Engineers, Inc., Fifth edition, Jul. 29, 1996.

*Primary Examiner*—Thomas Lee
*Assistant Examiner*—Tanh Nguyen
(74) *Attorney, Agent, or Firm*—Fleshner & Kim, LLP (57) ABSTRACT

The present invention relates to an ATM-LAN (Asynchronous Transfer Mode-Local Area Network) switch, and in particular to an information transferring apparatus between processors of the ATM-LAN which is capable of efficiently performing an information transfer between a plurality of processors which perform an information transmission and receiving operation through a backplane based on the Ethernet protocol. The information transfer apparatus between processors of an ATM-LAN switch according to the present invention is capable of implementing an efficient information transfer between processors by providing a backplane sub-board for thereby checking an information transfer state between the processors without using a large number of devices for an Ethernet communication. In addition, it is possible to enable a stable information transfer between processors in the case of a hot swap and dual operation by providing a control logic to the backplane sub-board.

17 Claims, 9 Drawing Sheets

U.S. PATENT DOCUMENTS

| | | | |
|---|---|---|---|
| 6,058,427 A | * 5/2000 | Viswanath et al. | 709/231 |
| 6,067,585 A | * 5/2000 | Hoang | 710/11 |
| 6,075,773 A | * 6/2000 | Clark et al. | 370/241 |
| 6,078,595 A | * 6/2000 | Jones et al. | 370/503 |
| 6,154,464 A | * 11/2000 | Feuerstraeter et al. | 370/463 |
| 6,169,729 B1 | * 1/2001 | Feuerstraeter | 370/296 |
| 6,172,975 B1 | * 1/2001 | Sallee | 370/359 |
| 6,201,789 B1 | * 3/2001 | Witkowski et al. | 370/230 |
| 6,229,817 B1 | * 5/2001 | Fischer et al. | 370/445 |
| 6,243,756 B1 | * 6/2001 | Whitmire et al. | 709/232 |

*Primary Examiner—*

INFORMATION TRANSFER APPARATUS HAVING CONTROL UNIT WITH BTL TRANSCEIVER APPLYING TRANSMISSION ENABLE SIGNAL INPUTTED FROM ETHERNET PROCESSOR MODULE THROUGH BACKPLANE TO CONTROL UNIT

BACKGROUND OF THE INVENTION

1. Field of the Invention

The present invention relates to an ATM-LAN (Asynchronous Transfer Mode-Local Area Network) switch, and in particular to an improved information transferring apparatus between processors for an ATM-LAN switch which is capable of effectively transferring information among a plurality of processors performing a transmission/receiving operation of data based on an Ethernet protocol through a backplane.

2. Description of the Background Art

Figure 1:
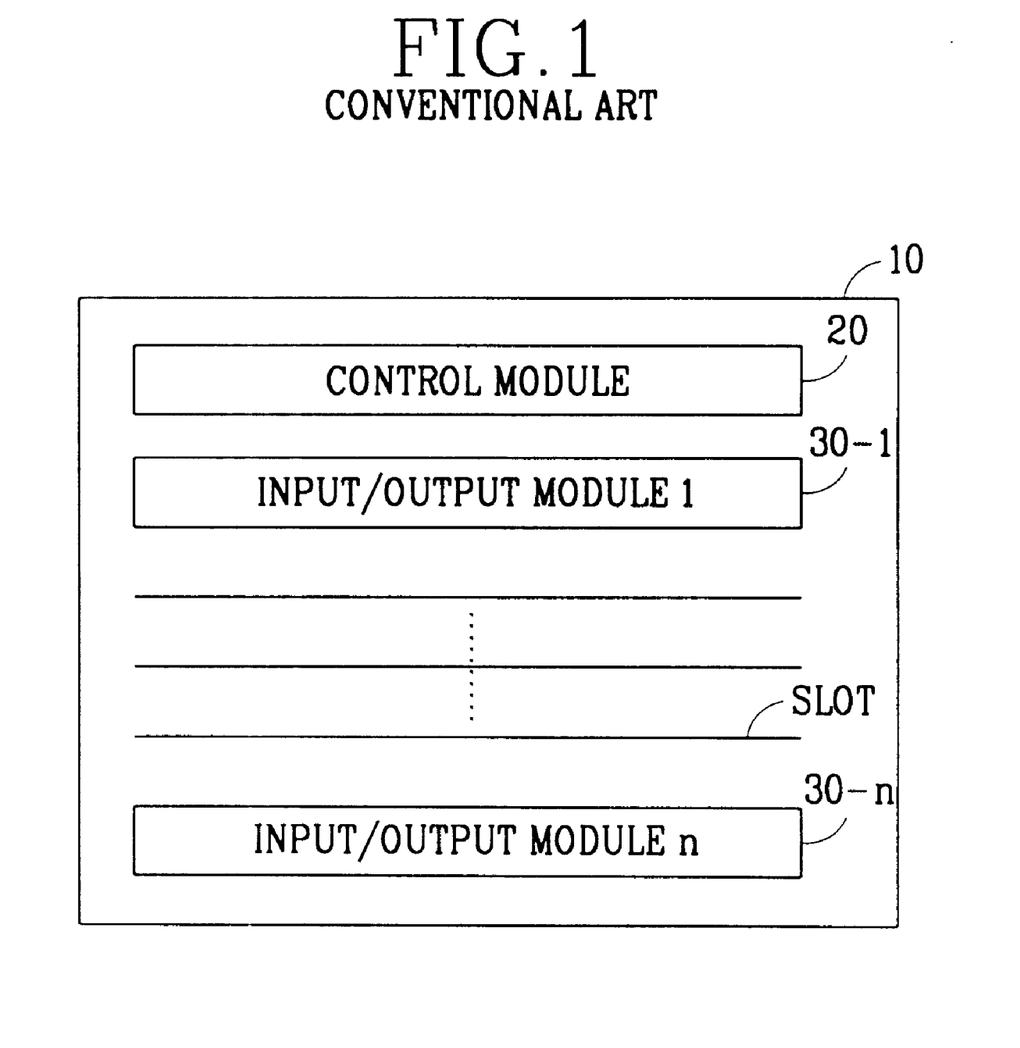
FIG. 1 is a schematic view illustrating a conventional ATM-LAN switch.

FIG. 1 illustrates a conventional ATM-LAN switch in which a plurality of processor modules 20, 30-1, . . . , 30-n, on a backplane 10. As shown therein, the ATM-LAN switch includes a plurality of input/output modules 30-1, . . . , 30-N inputting and outputting an information in response to a control signal from a control module 20, and a control module 20 transmitting a control signal to the input/output modules 30-1, . . . , 30-N, respectively and gathering the data from the input/output modules 30-1, . . . , 30-N and outputting to an externally connected management part.

For reference, recently, two control modules 20 are installed for thereby implementing a dual operation of the system.

The ATM-LAN switch is implemented using a protocol Ethernet for a data communication between one or two control modules 20 sharing the backplane 10 and a plurality of 30-1, . . . , 30-N. Therefore, the control module 20 and the input/output modules 30-1, . . . , 30-N include an information transferring apparatus for transferring an information through the backplane.

Figure 2A:
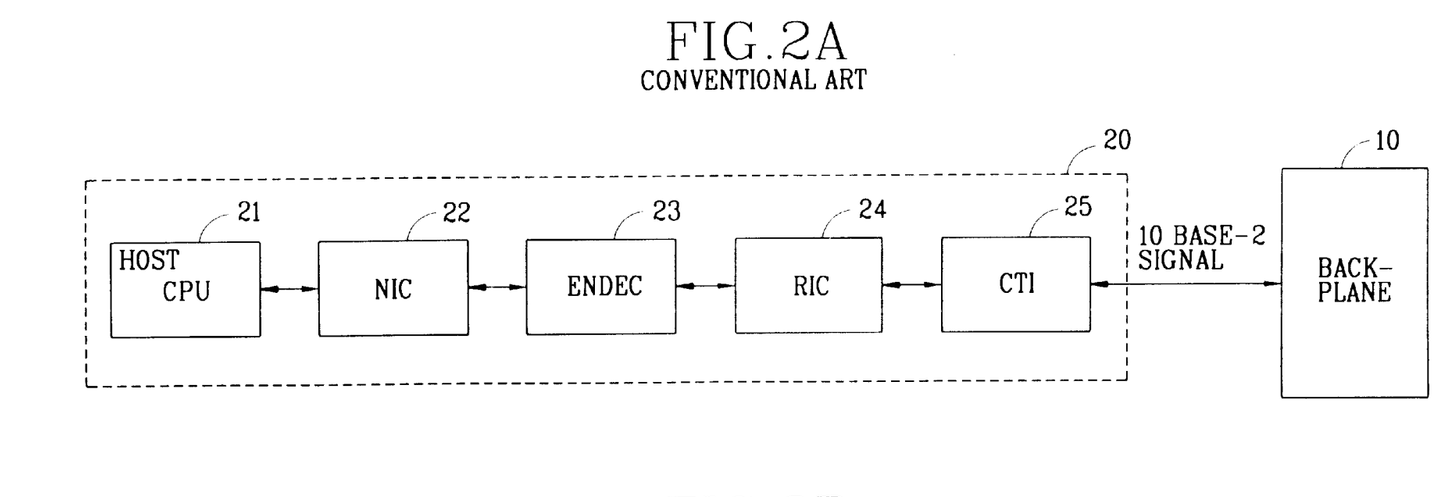
FIG. 2A is a detailed block diagram illustrating an information transferring apparatus of a control module.
Figure 2B:
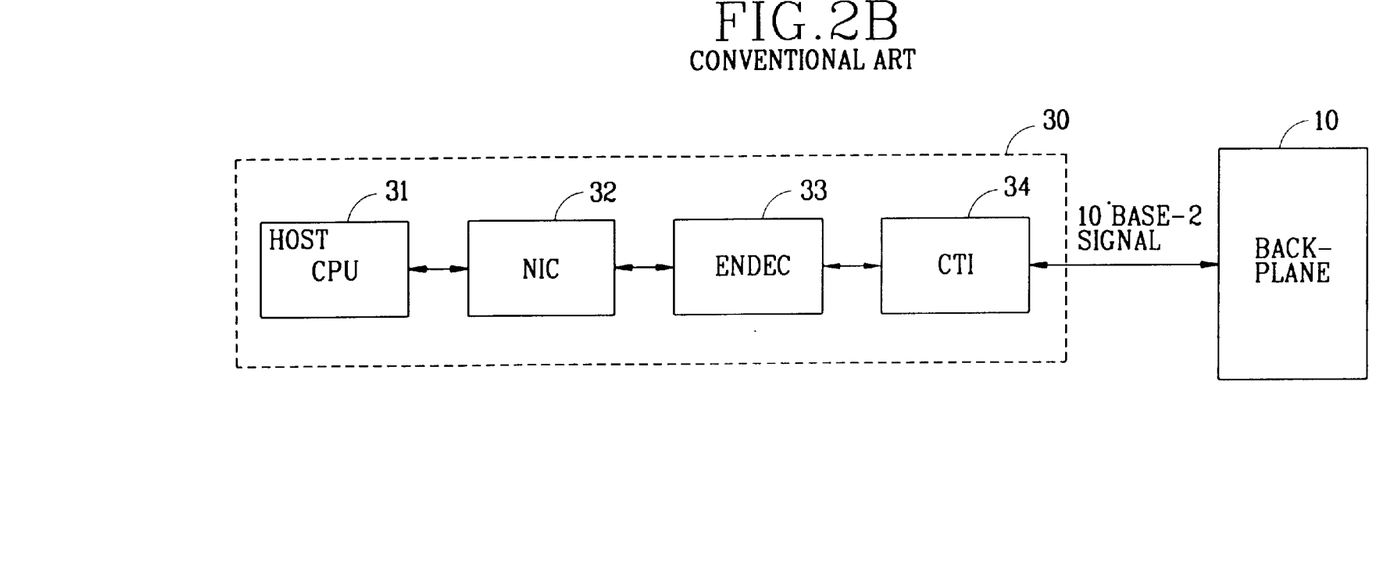
FIG. 2B is a detailed block diagram illustrating an information transferring apparatus of an input/output module.

FIGS. 2A and 2B illustrate an information transferring apparatus in the control module 20 and the input/output modules 30-1, . . . , 30-N.

As shown in FIG. 2A, the information transferring apparatus of the control module 20 includes a NIC(Netwrk Interface Controller) 22 which is an Ethernet controller connected in series with a host CPU(Central Processing Unit) 21, a RIC(Repeater Interface Controller) 24 receiving packets from the input/output modules 30-1, . . . , 30-N and transmitting the same to the NIC 22, an ENDEC(ENcoder and DECoder) 23 for encoding or decoding the packets between the NIC 22 and the RIC 24, and a CTI(Coaxial Transceiver Interface) 25 converting an input/output signal from the backplane 10 into a signal level proper for 10BASE-2.

As shown in FIG. 2B, the information transferring apparatus of each of the input/output modules 30-1, . . . , 30-N includes a NIC 32, an ENDEC 33 and a CTI 34 which are connected in series between the host CPU 31 and the backplane 10. Each block operates in the same manner as the blocks of FIG. 2A.

The operation of the information transferring apparatus of the control module 20 and the input/output module 30 will be explained.

First, the NIC 22 and 32 are an Ethernet controller, namely, a commercially available device capable of implementing a MAC(Media Access Control) used for a transmission/receiving operation of a packet designed under an Ethernet spec, namely, IEEE 802.3. Here, the MAC is directed to a transmission control technique which is used for the LAN and is an access control in order for several nodes to use an inner cable for thereby implementing a data link layer function because it is set at a lower sublayer of a data link layer of an OSI(Open System Interconnection) model for thereby commonly operating with a LLC(Logic Link Control) of an upper sublayer. Namely, the MAC performs an interface function between the LLC and the physical layer.

In addition, the ENDEC 23 and 33 encode the packet from the NIC 22 for a proper transmission and outputs to the RIC 24 or the CTI 34 and decodes the packet inputted from the RIC 24 or the CTI and outputs to the NIC 22 and 32.

The RIC 24 is provided at only the control module 20 and receives the packets from the input/output modules 30-1, . . . , 30-N and transmits to the NIC 22 through the ENDEC 23.

The CTI 25 and 34 convert the signals into a 10BASE-2 signal level and output thorough a connector connected in the backplane 10. Here, the 10BASE-2 is a LAN transmission spec standardized based on the IEEE 802.3. In this case, the transmission speed is 10 Mbit/s, the base band modulation method is used, and the length of the segment is about 200 m.

In the thusly constituted ATM-LAN switch, when the control signal passed through the backplane 10 through each of the blocks 21, 22, . . . , 25 of the control module 20 is inputted into the input/output modules 30-1, . . . , 30-n, a predetermined data passed through the blocks 31, 32, . . . , 34 at a corresponding input/output module is transmitted to the control module 20 through the backplane 10.

As described above, the conventional information transferring apparatus includes the ENDEC 23 and 32, the RIC 24 and the CTI 25 and 34 for transmitting the 10BASE-2 signal to the backplane based on the Ethernet spec(IEEE 802.3). These elements are the devices used for an Ethernet communication using an Ethernet cabling method between the remotely separated apparatuses.

Therefore, in order to implement a communication between the modules connected through the backplane, the Ethernet communication using the Ethernet cabling when communicating between the separated apparatuses is used for thereby increasing the number of elements.

SUMMARY OF THE INVENTION

Accordingly, it is an object of the present invention to provide an information transferring apparatus between processors for an ATM-LAN switch which overcomes the aforementioned problems encountered in the background art.

It is another object of the present invention to provide an information transferring apparatus between processors for an ATM-LAN switch which is capable of preventing a consumption of the devices when performing an information transfer between the processors of an ATM-LAN switch using an Ethernet communication through a backplane.

It is another object of the present invention to provide an information transferring apparatus between processors for an ATM-LAN switch which is capable of effectively implementing an information transfer even when an information request between processor modules and a response timing are unclear.

It is another object of the present invention to provide an information transferring apparatus between processors for an ATM-LAN switch which is applicable to implementing a hot swap and dual operation structure.

To achieve the above objects, there is provided an information transferring apparatus between processors for an ATM-LAN switch which includes more than at least one processor module which performs an Ethernet data transmission and receiving operation therebetween, and a controller for directly receiving a data among a plurality of processor modules and controlling a communication, and a synchronizing unit provided for an operation timing of the controller.

To achieve the above objects, there are provided a controller included in the backplane sub-board for controlling a data communication between processor modules, a BTL transceiver included in the backplane or each module for transmitting a clock signal for a data transmission and receiving operation and performing a data transmission and receiving operation, a NIC(Network Interface Controller) included in each module for performing a medium access control for the data transmission and receiving operation, and an oscillator for generating a clock signal having a predetermined frequency and applying to the controller or the BTL transceiver, wherein an ATM-LAN switch includes one or two control modules controlling a plurality of input/output modules mounted at each slot of the backplane and inputting and outputting data in response to a predetermined request, one or two control modules controlling the input/output modules, and a backplane sub-board connected through the backplane connector.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B are block diagrams illustrating an information transferring apparatus of each module of a conventional ATM-LAN switch, of which:

FIGS. 3A and 3B are block diagrams illustrating an information transferring apparatus between processors for an ATM-LAN switch according to a first embodiment of the present invention, of which:

FIGS. 9A through 9C are block diagrams illustrating an information transferring apparatus between processors for an ATM-LAN switch according to a second embodiment of the present invention, of which:

DETAILED DESCRIPTION OF THE PREFERRED EMBODIMENTS

Figure 3A:
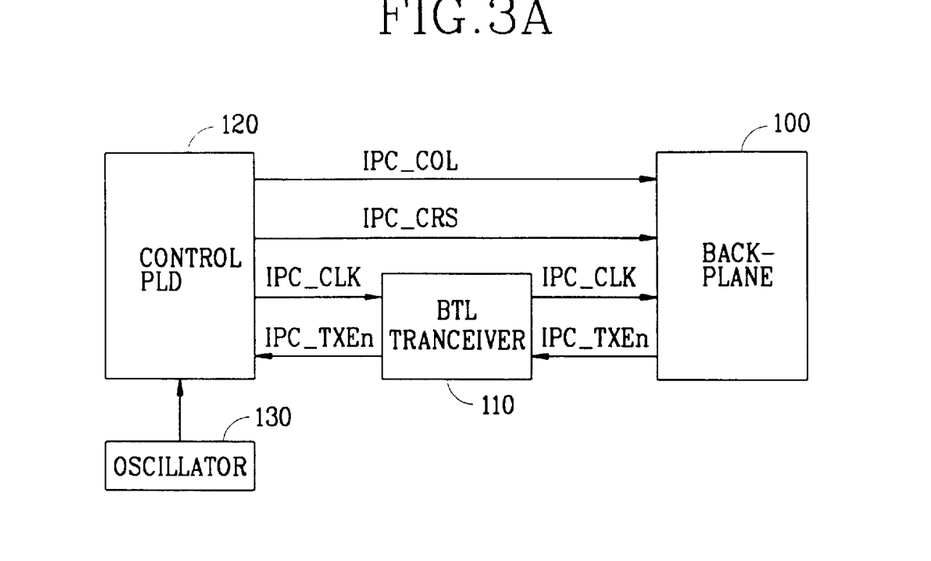
FIG. 3A is a detailed block diagram illustrating an information transferring apparatus of a backplane sub-board.
Figure 3B:
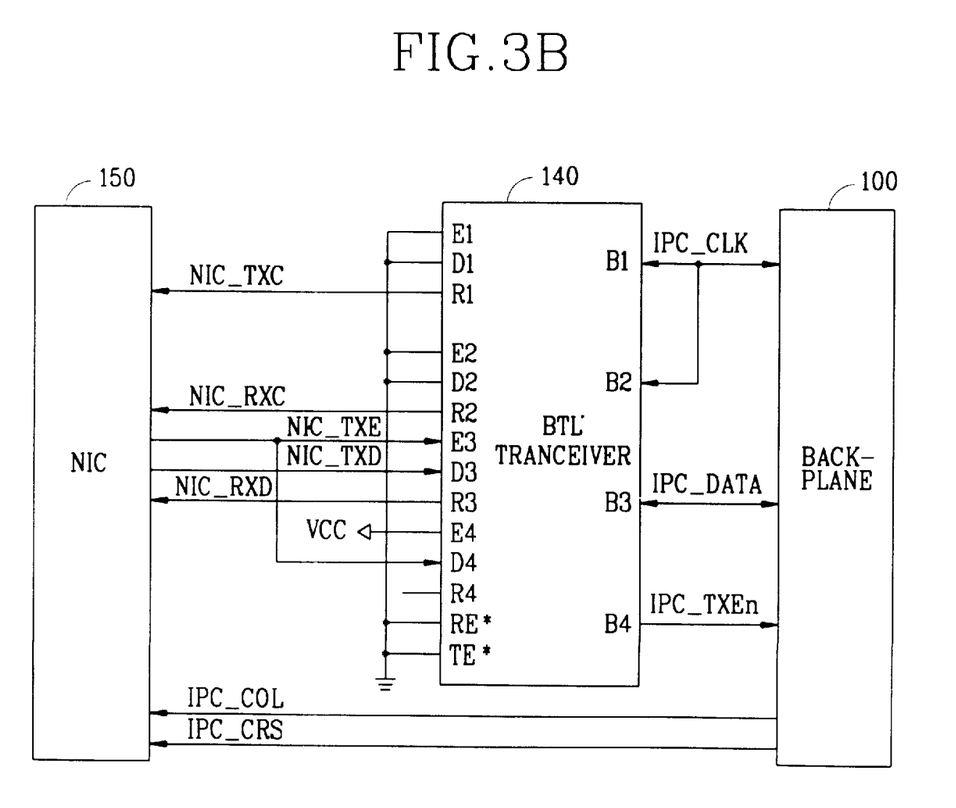
FIG. 3B is a detailed block diagram illustrating an information transferring apparatus of a control module and an input/output module.

FIGS. 3A and 3B are views illustrating an information transfer apparatus between processors for an ATM-LAN switch according to a first embodiment of the present invention. Of which, FIG. 3A illustrates an information transfer apparatus of a backplane board connected through a backplane connector, and FIG. 3B illustrates an information transfer apparatus of each module.

As shown in FIG. 3A, the ATM-LAN switch according to a first embodiment of the present invention is basically formed of a backplane sub-board including an information transfer apparatus which includes a control PLD (Programmable Logic Device) 120 for controlling a communication between processor modules, a BTL transceiver 110 for transmitting/receiving data based on a BTL (Backplane Transceiver Logic) between the control PLD 120 and the backplane 100, and an oscillator 130 generating a clock signal for implementing an internal operation of the control PLD 120 and a data transmission/receiving operation between the modules.

In addition, as shown in FIG. 3B, the information transfer apparatus installed at a control module and input/output module for an ATM-LAN switch according to a first embodiment of the present invention includes a NIC 150 which is an Ethernet controller, and a BTL transceiver 140 for transmitting and receiving data using a BTL between the NIC 150 and the backplane 100.

Figure 4:
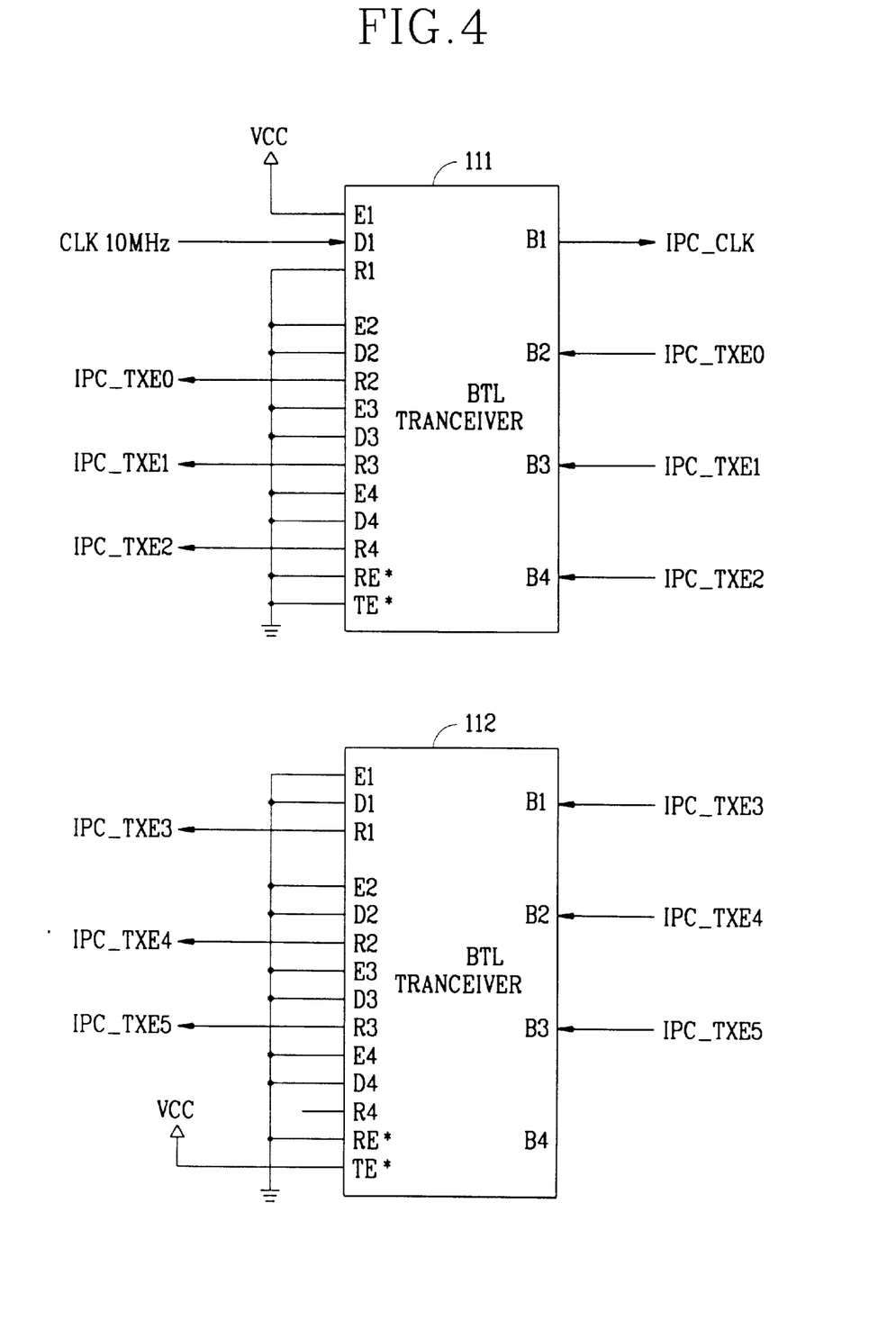
FIG. 4 is a detailed view illustrating an input/output signal of the BTL transceiver of FIG. 3A.

FIG. 4 illustrates the BTL transceiver 110 of the backplane subs-board. As shown therein, the ATM-LAN switch has 6 slots into which modules are mounted.

As shown the rein, since the BTL transceiver 110 inputs/outputs a clock signal IPC_CLK and transmission enable signals IPC_TXE0~5 applied from six modules, the first BTL transceiver 111 and second BTL transceiver 112 each having four pairs of input/output terminals are used.

FIGS. 5 through 8 illustrate detailed circuits for generating a carrier sensing signal(IPC_CRS) and a collision detection signal(IPC_COL) at the control PLD 120.

The preferred embodiments of the present invention will be explained in more detail with reference to the accompanying drawings.

First, the control PLD 120 installed on the backplane sub-board which is additionally provided on the backplane 100 controls a communication between the processors.

The control PLD 120 detects a transmission enable signal IPC_TXEn inputted from each module through the backplane 100 and the BTL transceiver 110 and generates an IPC_CRS signal and IPC_COL signal and outputs the thusly generated signals to each module through the backplane 100. In order to provide a reference clock for the data transmission/receiving operation in each module, a clock signal driving an internal operation of the control PLD 120 which signal is applied from the oscillator 130, for example, a clock signal IPC_CLK dividing 100 MHz clock signal into 10 MHz signal, is transmitted to the BTL transceiver 110.

Here, the IPC_TXEn is generated from each module. This signal indicates an intention that the packet transmission is to be made before the transmission of the same is made. At this time, n represents an IPC_TXE signal generated at the n-th module.

In addition, the IPC_CRS signal is a signal indicating that a packet is currently being transmitted from at least one module on the Ethernet bus, and the IPC_COL signal is a signal indicating that there is a collision of the packet on the Ethernet bus.

Figure 5:
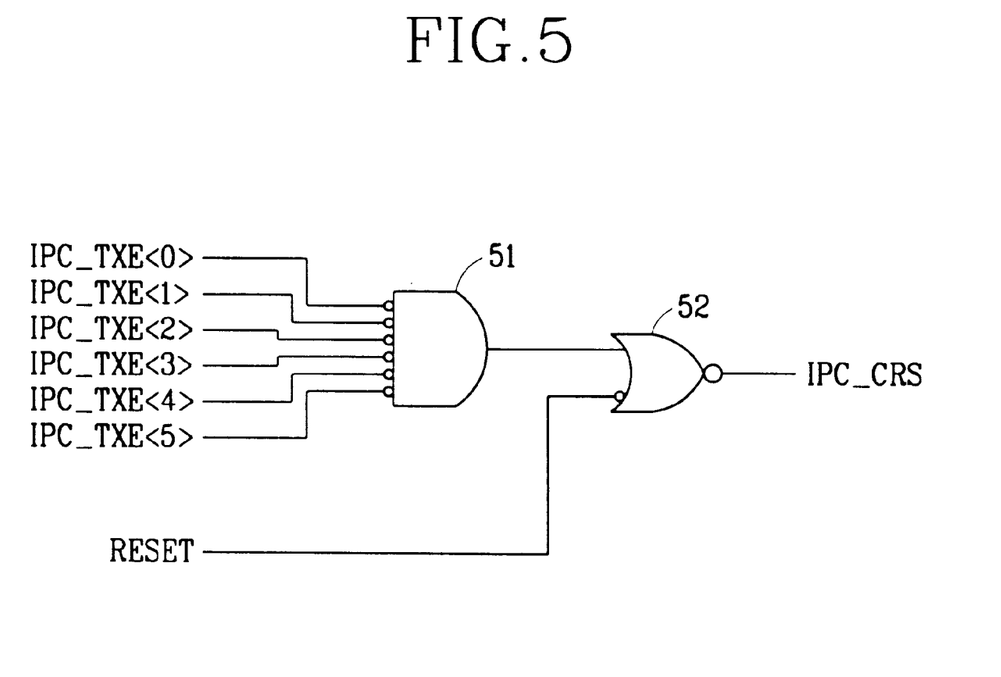
FIG. 5 is a circuit diagram illustrating a carrier sensing signal(IPC_CRS) generation circuit at a control PLD according to the present invention.

Assuming that the entire number of the modules is 6, the IPC_CRS generation circuit receives an IPC_TXE0~5 and reset signals RESET and judges the transmission enable state TXE_STATE and generates an IPC_CRS signal in accordance with a transmission enable state TXE_STATE.

In more detail, when the IPC_TXE signal is inputted in a form of "000000" or a low level(0) reset signal RESET is inputted, the TXE_STATE is judged to be a "noact" state. Therefore, in this case, the IPC_CRS generation circuit generates a low level(0) IPC_CRS signal and outputs the same.

In addition, if the IPC_TXE signal has one of "000001", "000010", "000100", "001000", "010000"and "100000", then the TXE_STATE is judged to be a "single" state. If the signal except for the above-described signals is inputted as the IPC_TXE signal, the TXE_STATE is judged to be a "multi" state. Therefore, the IPC_CRS generation circuit generates a high level(1) IPC_CRS signal and outputs the same.

In other words, if the IPC_TXE signals which are activated at more than one module among six modules are inputted, the IPC_CRS signal is changed to a high level(1) state and then is outputted.

The circuit for generating the above-described IPC_CRS signal is shown in FIG. 5.

As shown therein, the IPC_CRS generation circuit includes an AND-gate 51 for ANDing the inverted signals of the IPC_TXE<0>~<5> inputted from each module, and a NOR-gate 52 for NORing the output signal from the AND-gate 51 and an inverted signal of the RESET signal and outputting an IPC_CRS signal.

The state level equation of the IPC_CRS generation circuit may be expressed as follows:

/IPC_CRS=/RESET+/"IPC_TXE<5>"*/IPC_TXE<4>"*/"IPC_TXE<3>"*/"IPC_TXE<2>*/"IPC_TXE<1>"*/"IPC_TXE<0>"

In addition, the control panel 120 generates an IPC_COL signal when more than two modules concurrently transmit the IPC_TXE signal transmits the thusly generated signal to the NIC 150 of each module through the backplane 100. At this time, the IPC_COL signal is maintained for at least 200 ns for meeting the operational characteristic of the NIC 150.

Figure 6:
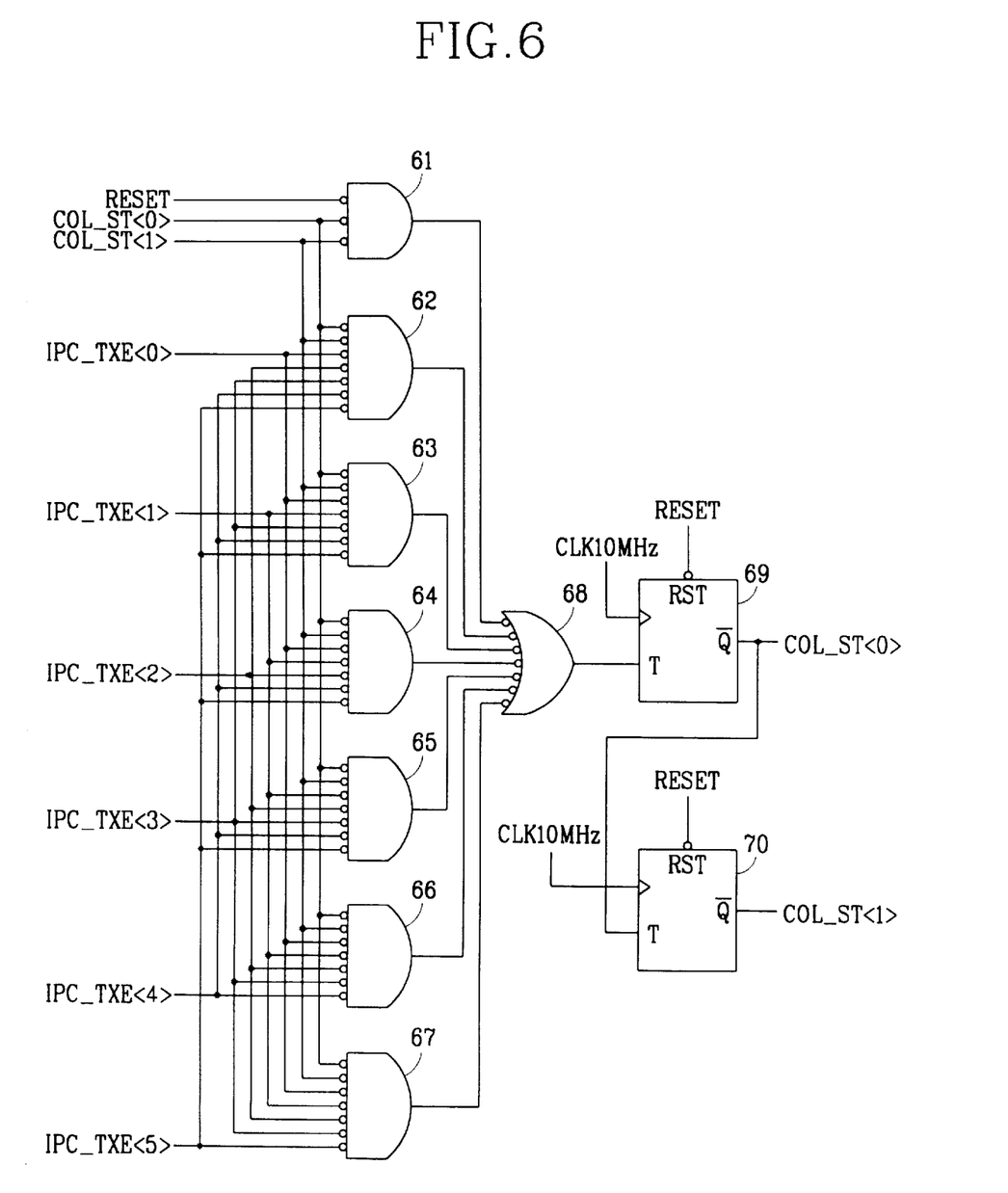
FIG. 6 is a circuit diagram illustrating a collision state signal(COL_ST) generation circuit at a control PLD according to the present invention.

As shown in FIG. 6, a circuit for generating a collision state signal COL_ST is formed. The COL_ST generation circuit includes an AND-gate 61 for ANDing the inverted signals of a RESET, COL_ST<0> and COL_ST<1> signals, an AND-gate 62 for ANDing the inverted signals of IPC_TXE<5>, IPC_TXE<4>, IPC_TXE<3>, IPC_TXE<2>, COL_ST<0> and COL_ST<1>, an AND-gate 63 for ANDing the inverted signals of IPC_TXE<5>, IPC_TXE<4>, IPC_TXE<3>, IPC_TXE<1>, IPC_TXE<0>, COL_ST<0>, and COL_ST<1>, an AND-gate 64 for ANDing the inverted signals of IPC_TXE<5>, IPC_TXE<4>, IPC_TXE<2>, IPC_TXE<1>, IPC_TXE<0>, COL_ST<0>, and COL_ST<1>, an AND-gate 65 for ANDing the inverted signals of IPC_TXE<5>, IPC_TXE<4>, IPC_TXE<3>, IPC_TXE<2>, IPC_TXE<1>, COL_ST<0>, and COL_ST<1>, an AND-gate 66 for ANDing the inverted signals of IPC_TXE<4>, IPC_TXE<3>, IPC_TXE<2>, IPC_TXE<1>, IPC_TXE<0>, COL_ST<0>, and COL_ST<1>, an AND-gate 67 for ANDing the inverted signals of IPC_TXE<5>, IPC_TXE<3>, IPC_TXE<2>, IPC_TXE<1>, IPC_TXE<0>, COL_ST<0>, and COL_ST<1>, an OR-gate 68 for ORing the signals from the AND-gates 61, 62, . . . , 67), a flip-flop 69 for receiving an output signal from the NOR-gate 68 and outputting a COL_ST<0> signal in synchronization with 100 MHz, and a flip-flop 70 receiving an output signal COL_ST<0> from the flip-flop 69 and outputting a COL_ST<1> in synchronization with 100 MHz.

At this time, the 10 MHz clock signal applied to the flip-flop 69 and 70 divides the 100 MHz clock generated from the oscillator 130 into 10 MHz for implementing an operation of the control PLD 110.

The gate level equation of the collision detection signal generation circuit may be expressed as follows:

/"COL_ST<0>"T=/RESET*/"COL_ST<0>"

*/"COL_ST<1>"+/"IPC_TXE<5>"

*/"IPC_TXE<4>"*/"IPC_TXE<3>"

*/"IPC_TXE<2>"*/"IPC_TXE<0>"

*/"COL_ST<0>"*/"COL_ST<1>"

+/"IPC_TXE<5>"*/"IPC_TXE<4>"

*/"IPC_TXE<3>"*/"IPC_TXE<1>"

*/"IPC_TXE<0>"*/"COL_ST<0>"

*/"COL_ST<1>"+/"IPC_TXE<5>"

*/"IPC_TXE<4>"*/"IPC_TXE<2>"

*/"IPC_TXE<1>"*/"IPC_TXE<0>"

*/"COL_ST<0>"*/"COL_ST<1>"

+/"IPC_TXE<5>"*/"IPC_TXE<4>"

*/"IPC_TXE<3>"*/"IPC_TXE<2>"

*/"IPC_TXE<1>"*/"COL_ST<0>"

*/"COL_ST<1>"+/"IPC_TXE<4>"

*/"IPC_TXE<3>"*/"IPC_TXE<2>"

*/"IPC_TXE<1>"*/"IPC_TXE<0>"

*/"COL_ST<0>"*/"COL_ST<1>"

+/"IPC_TXE<5>"*/"IPC_TXE<3>"

*/"IPC_TXE<2>"*/"IPC_TXE<1>"

*/"IPC_TXE<0>"*/"COL_ST<0>"

*/"COL_ST<1>"

"COL_ST<0>".CLKF=CLK10M

"COL_ST<0>".RSTF=/RESET

"COL_ST<0>".PRLD=GND

/"COL_ST<1>".T=/"COL_ST<0>"

"COL_ST<1>".CLKF=CLK10M

"COL_ST<1>".RSTF=/RESET

Figure 7:
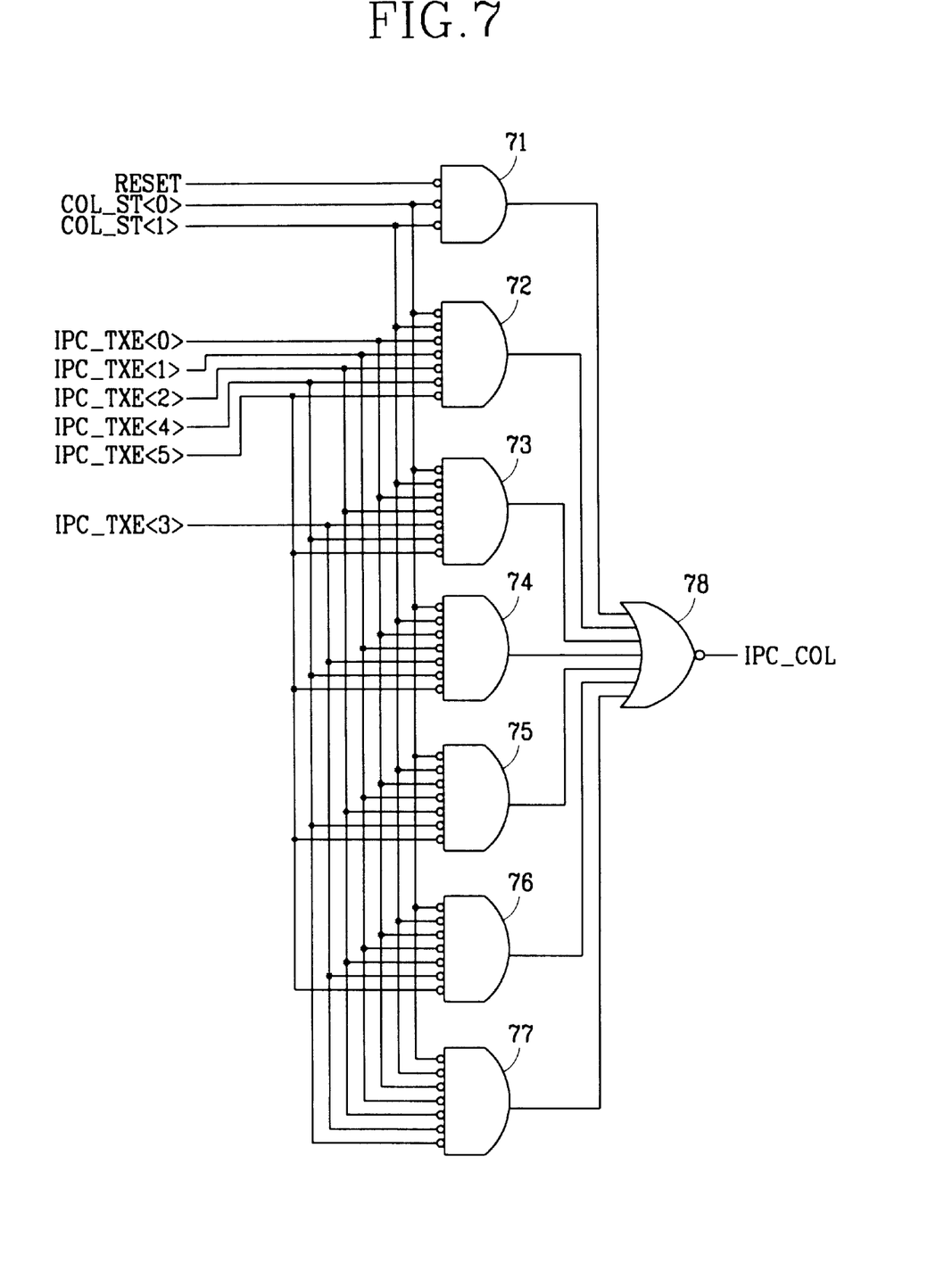
FIG. 7 is a circuit diagram illustrating a collision detection signal(IPC_COL) generation circuit at a control PLD according to the present invention.

The control PLD 120 generates an IPC_COL signal in accordance with the COL_ST signal and an IPC_TXE signal inputted from each module. FIG. 7 illustrates the IPC_COL generation circuit.

As shown therein, the IPC_COL generation circuit includes an AND-gate 71 for ANDing the inverted signals of the RESET, COL_ST<0> and COL_ST<1>, an AND-gate 72 for ANDing the inverted signals of IPC_TXE<5>, IPC_TXE<4>, IPC_TXE<2>, IPC_TXE<1>, IPC_TXE<0>, COL_ST<0> and COL_ST<1>, an AND-gate 73 for ANDing the inverted signals of IPC_TXE<5>, IPC_TXE<4>, IPC_TXE<3>, IPC_TXE<2>, IPC_TXE<0>, COL_ST<0> and COL_ST<1>, an AND-gate 74 for ANDing the inverted signals of IPC_TXE<5>, IPC_TXE<4>, IPC_TXE<3>, IPC_TXE<1>, IPC_TXE<0>, COL_ST<0> and COL_ST<1>, an AND-gate 75 for ANDing the inverted signals of IPC_TXE<5>, IPC_TXE<4>, IPC_TXE<2>, IPC_TXE<1>, IPC_TXE<0>, COL_ST<0> and COL_ST<1>, an AND-gate 76 for ANDing the inverted signals of IPC_TXE<5>, IPC_TXE<3>, IPC_TXE<2>, IPC_TXE<1>, IPC_TXE<0>, COL_ST<0> and COL_ST<1>, an AND-gate 77 for ANDing the inverted signals of IPC_TXE<4>, IPC_TXE<3>, IPC_TXE<2>, IPC_TXE<1>, IPC_TXE<0>, COL_ST<0> and COL_ST<1>, and a NOR-gate 78 for NORing the signals from the AND-gates 71 through 77 and outputting an IPC_COL signal.

The gate level equation of the above-described circuit may be expressed as follows:

/IPC_COL=/RESET*/"COL_ST<0>"./"COL_ST<1>"

+/"IPC_TXE<5>"*/"IPC_TXE<4>"

*/"IPC_TXE<3>"*/"IPC_TXE<2>"

*/"IPC_TXE<1>"*/"COL_ST<0>"

*/"COL_ST<1>"+/"IPC_TXE<5>"

*/"IPC_TXE<4>"*/"IPC_TXE<3>"

*/"IPC_TXE<2>"*/"IPC_TXE<0>"

*/"COL_ST<0>"*/"COL_ST<1>"

+/"IPC_TXE<5>"*/"IPC_TXE<4>"

*/"IPC_TXE<3>"*/"IPC_TXE<1>"

*/"IPC_TXE<0>"*/"COL_ST<0>"

*/"COL_ST<1>"+/"IPC_TXE<5>"

*/"IPC_TXE<4>"*/"IPC_TXE<2>"

*/"IPC_TXE<1>"*/"IPC_TXE<0>"

*/"COL_ST<0>"*/"COL_ST<1>"

+/"IPC_TXE<5>"*/"IPC_TXE<3>"

*/"IPC_TXE<2>"*/"IPC_TXE<1>"

*/"IPC_TXE<0>"*/"COL_ST<0>"

*/"COL_ST<1>"+/"IPC_TXE<4>"

*/"IPC_TXE<3>"*/"IPC_TXE<2>"

*/"IPC_TXE<1>"*/"IPC_TXE<0>"

*/"COL_ST<0>"*/"COL_ST<1>"

Figure 8:
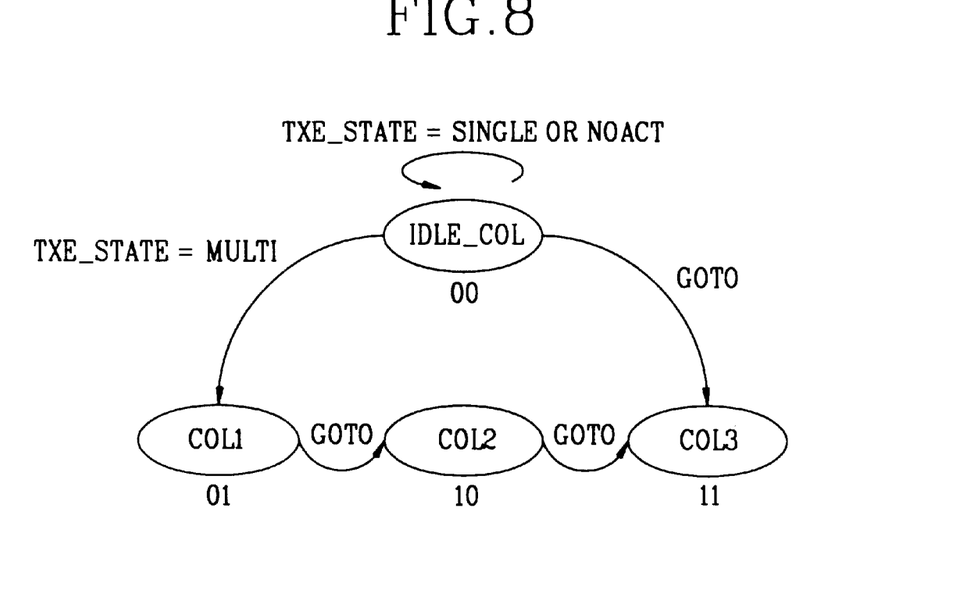
FIG. 8 is a view illustrating a state machine implementing a collision detection signal(IPC_COL) generator.

FIG. 8 illustrates a state machine which implements the IPC_COL signal generation. As shown therein, the state sequence of the IPC_COL signal may be classified into four steps IDLE_COL, COL1, COL2, COL3 by a combination of the COL_ST<0> signal and COL_ST<1> signal which are the output signals from the COL_ST generation circuit. Here, the driving clock of the state machine is 10 MHz wherein one cycle corresponds to the 100 nano second.

When the activated IPC_TXE signal is not inputted, or if the activated IPC_TXE signal is inputted from one module, namely, if the TXE_STATE is "noact" or "single" state, the IPC_COL generation circuit becomes an idle IDLE_COL state and generates a low(0) level IPC_COL signal.

In addition, when the IPC_TXE signals which are concurrently activated by more than two modules are inputted, namely, the TXE_STATE is in the "multi" state, the operation condition of the NIC 150 is satisfied by maintaining a high level for minimum 300 ns by continuously performing COL1 through COL3 at the time when the IPC_COL signal is converted to a high(1) level state.

The generation logic equation of the IPC_COL signal may be expressed as follows:

IPC_COL<="1" when(txe_state=multi) or (col_st=COL1) or (col_st=COL2) or (col_st=COL3) else "0"

The IPC_CRS signal and IPC_COL signal generated by the control PLD 120 of the backplane sub-board are transmitted to the NIC 150 formed in the control module and input/output module, so that an information transfer between the control module and the input/output module is implemented.

In addition, the BTL transceiver 110 mounted on the backplane sub-board transfers the IPC_TXE signal inputted from each module through the backplane 100 to the control PLD 120, and transfers the 10 MHz IPC_CLK signal applied from the control PLD 120 to each module through the backplane 100.

As shown in FIG. 3B, the operation of the data transmission/receiving of the information transfer apparatus installed in each module will be explained.

First, the NIC 150 connected with the host CPU(not shown) in the information transfer apparatus of each module is an Ethernet controller for thereby implementing a medium connection control structure, namely, controlling the transmission and receiving operation of the packet based on the IEEE 802.3.

In detail, the NIC 150 transmits the NIC_TXE signal which indicates that the packet is to be transmitted to the control PKD 120 of the backplane sub-board through the BTL transceiver 140 and the backplane 100 and judges whether it is possible to transmit the data in accordance with the IPC_CRS signal and IPC_COL signal inputted from the control PLD 120 through the backplane 100.

Namely, if the IPC_CRS and IPC_COL signal are low level(0), the data transmission is started, and otherwise, the IPC_TXE signal is re-transmitted after a predetermined time lapsed. These steps are repeated.

At this time, the BTL transceiver 140 receives an IPC_CLK signal from the backplane sub-board and transmits the transmission clock signal NIC_TXC and the receiving clock signal NIC_RXC to the NIC 150 and converts the data signal NIC_TXD from the NIC 150 into a signal IPC_DATA corresponding to the transmission logic of the backplane and transmits to the backplane 100 in synchronization with the IPC_CLK signal.

The NIC 150 of each module transmits the NIC_TXD signal to the BTL transceiver 140 in synchronization with the NIC_TXC signal inputted from the BTL transceiver 140, and the BTL transceiver 140 transmits the IPC_DATA to the backplane 100 together with the IPC_CLK signal.

In addition, when the IPC_DATA signal is inputted from the other side module through the backplane 100, the BTL transceiver 140 converts the thusly received signal into a receiving data signal NIC_RXD and transmits to the NIC 150 in synchronization with the NIC_RXC signal. Therefore, the NIC 150 receives the receiving data signal NIC_RXD received together with the NIC_RXC signal.

The data transmission and receiving operation between the processor modules is implemented in the above-described manner.

Figure 9A:
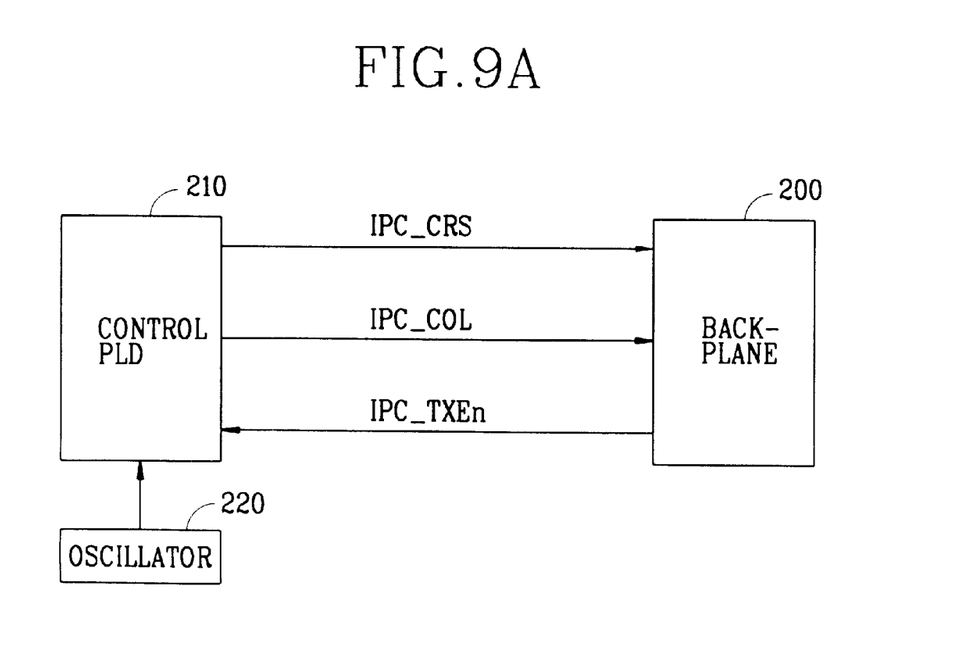
FIG. 9A is a detailed block diagram illustrating an information transferring apparatus of a backplane sub-board.
Figure 9B:
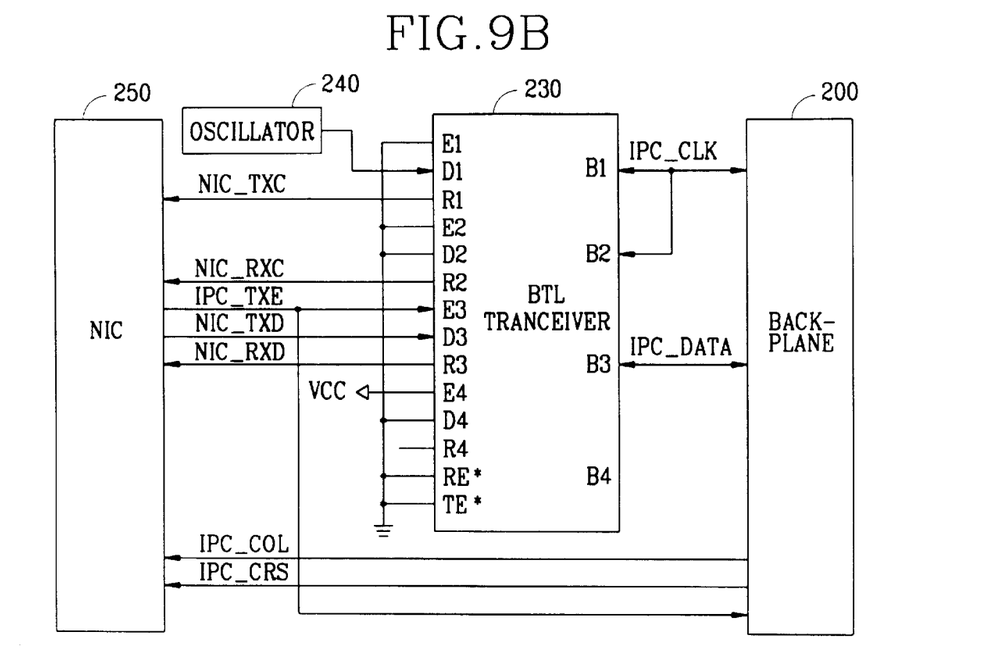
FIG. 9B is a detailed block diagram illustrating an information transferring apparatus of a control module.
Figure 9C:
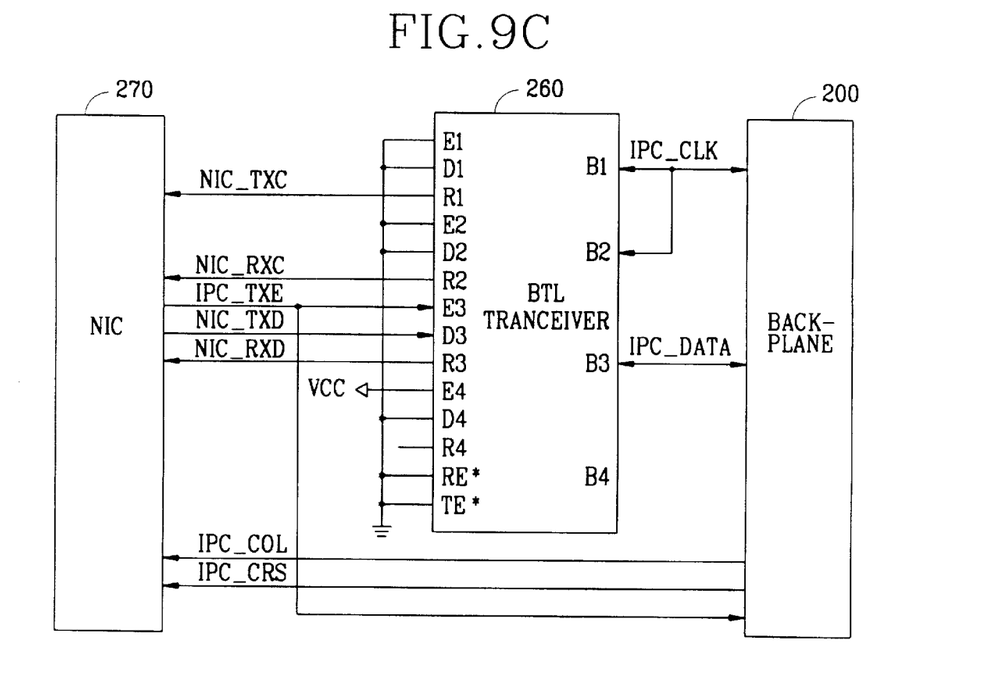
FIG. 9C is a detailed block diagram illustrating an information transferring apparatus of an input/output module.

FIGS. 9A through 9C illustrate an information transfer apparatus between the processors of the ATM-LAN switch according to a second embodiment of the present invention. In the second embodiment of the present invention, an oscillator 240 is additionally provided in the control module for generating a clock signal for implementing a data transmission and receiving operation between the processor modules, so that it is possible to minimize the functions of the backplane sub-board for thereby obtaining a stable ATM-LAN switch.

FIG. 9A illustrates an information transfer apparatus in the backplane sub-board, and FIGS. 9B and 9C illustrate an information transfer apparatus in the control module and the input/output module.

As shown in FIG. 9A, the ATM-LAN switch according to a second embodiment of the present invention additionally includes a backplane sub-board formed of a control PLD 210 and an oscillator 220 generating a clock signal needed for the operation of the control PLD 210.

The information transfer apparatus provided in the control module of the ATM-LAN switch according to the second embodiment of the present invention, as shown in FIG. 9B, is formed of a NIC 250, a BTL transceiver 230, and an oscillator 240 generating a reference clock signal of 10 MHz for a transmission and receiving operation of the data between the processor modules.

In addition, as shown in FIG. 9C, the information transfer apparatus provided in the input/output module of the ATM-LAN switch according to the second embodiment of the present invention includes a NIC 270 and a BTL transceiver 260.

The operation of the second embodiment which is the same as the first embodiment will be omitted except for the following different features.

First, in the information transfer apparatus of the backplane sub-board, the IPC_TXE signal inputted from he NIC 250 and 270 of each module is directly applied to the control PLD 210 through the backplane 200 not through the BTL transceiver because no problems occurs even when the TTL level is directly connected since the IPC_TXE signal is a point-to-point signal.

As explained in the first embodiment of the present invention, the control PLD 210 generates an IPC_CRS signal and an IPC_COL signal, and the thusly generated signals are transmitted to the NIC 250 and 270 of the control module and the input/output module.

In addition, the NIC 250 and 270 transmits the NIC_TXD signal in synchronization with the transmission clock signal NIC_TXC inputted from the BTL transceivers 230 and 260 and receives a NIC_RXD signal inputted in synchronization with the receiving clock signal NIC_RXC. At this time, the clock signal NIC_TXC is that the 10 MHz clock pulse generated by the oscillator 240 additionally provided in the control module is transferred to each module by the BTL transceiver 230.

Since the data transmission/receiving operation between the modules is implemented in accordance with a clock signal outputted from the control module. it is possible to implement a stable operation of the system even when the system is formed in a dual operation structure.

As described above, the information transfer apparatus connected between the processors of the ATM-LAN switch according to the present invention includes a backplane sub-board for thereby judging an information transfer state between the processors, so that it is possible to effectively transfer the information between the processors without using a large number of devices for the Ethernet communication and decrease the fabrication cost of the system compared to the conventional art.

In addition, in the present invention, it is possible to stably perform the information transfer between the processors even when the hot swap or dual operation system is used by providing a control logic to the backplane sub-board.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An information transferring apparatus between processors of an ATM-LAN switch, comprising:

at least one processor module configured to transmit and receive Ethernet data, the at least one processor module having a first BTL transceiver to transmit and receive data between an Ethernet controller and a backplane;

a control unit configured to directly receive data from the at least one processor module and control communication, the control unit having a second BTL transceiver configured to apply a transmission enable signal inputted from the at least one processor module through the backplane to the control unit and transfer a clock signal from the control unit to each processor module through the backplane; and a synchronizing unit configured to provide an operation timing of the control unit.

2. The apparatus of claim 1, wherein the control unit is provided in the backplane.

3. The apparatus of claim 1, wherein the Ethernet controller is configured to implement a medium access control.

4. The apparatus of claim 1, wherein the control unit comprises:

a detection circuit to detect at least one transmission enable signal inputted from the at least one processor module through the backplane and to generate one of a carrier sensing signal and a collision detection signal in accordance with a state of the at least one transmission enable signal; and a circuit to transmit the clock signal applied from the synchronization unit.

5. The apparatus of claim 4, wherein the carrier sensing signal is activated when more than one transmission enable signal is inputted.

6. The apparatus of claim 4, wherein the collision detection signal is activated when more than two transmission enable signals are inputted or one of a first and second collision state signal is inputted.

7. The apparatus of claim 4, wherein the control unit further comprises a state signal circuit to generate first and second collision state signals at a prescribed interval when more than two transmission enable signals are inputted.

8. The apparatus of claim 3, wherein the Ethernet controller outputs a transmission enable signal to the first BTL transceiver, determines whether transmission data is available in accordance with one of a carrier sensing signal and a collision detection signal inputted through the backplane, performs one of data transmission to the backplane in accordance with a result of the determination and reception of data from the backplane through the first BTL transceiver.

9. The apparatus of claim 8, wherein the Ethernet controller transmits data when the carrier sensing signal and collision detection signal are both at a logical low level, and otherwise repeatedly re-transmits the transmission enable signal after a prescribed period of time.

10. The apparatus of claim 3, wherein the first BTL transceiver transmits the transmission enable signal and transmission data from the Ethernet controller to the backplane, and the clock signal and receiving data inputted from the backplane are transmitted to the Ethernet controller.

11. An apparatus to transfer information between processors of an ATM-LAN switch, comprising:

a plurality of processor modules configured to transmit and receive packet data;

a programable logic device (PLD) configured to receive data from at least one of the plurality of processor modules and control communication between the processors;

a first BTL transceiver to transmit and receive data between a protocol controller of at least one of the plurality of processor modules and a backplane; and a second BTL transceiver configured to apply a transmission enable signal inputted from the at least one processor module through the backplane to the PLD and transfer a clock signal from the PLD to each processor module through the backplane.

12. The apparatus of claim 11, wherein each of the plurality of processor modules comprises an Ethernet controller.

13. The apparatus of claim 11, wherein the PLD comprises a detection circuit to detect at least one transmission enable signal inputted from the at least one of the plurality of processor modules through the backplane, and to generate one of a carrier sensing signal and a collision detection signal in accordance with a state of the at least one transmission enable signal.

14. The apparatus of claim 11, wherein the first BTL transceiver transmits and receives data between a protocol controller of a corresponding processor module and the backplane, wherein the protocol controller is configured to implement a medium access control.

15. The apparatus of claim 14, wherein the protocol controller comprises an Ethernet controller.

16. The apparatus of claim 14, wherein the protocol controller outputs a transmission enable signal to the first BTL transceiver, determines whether transmission data is available in accordance with one of a carrier sensing signal and a collision detection signal inputted through the backplane, performs one of data transmission to the backplane in accordance with a result of the determination and reception of data from the backplane through the first BTL transceiver.

17. The apparatus of claim 16, wherein the protocol controller transmits data when the carrier sensing signal and collision detection signal are both at a logical low level, and otherwise repeatedly re-transmits the transmission enable signal after a prescribed period of time.

\* \* \* \* \*